(12) United States Patent
Tadyeh

(10) Patent No.: US 8,741,382 B1
(45) Date of Patent: Jun. 3, 2014

(54) METHODS OF PAINTING

(76) Inventor: John E Tadyeh, Franklin, WI (US)

( * ) Notice: Subject to any disclaimer, the term of this patent is extended or adjusted under 35 U.S.C. 154(b) by 45 days.

(21) Appl. No.: 12/807,435

(22) Filed: Sep. 2, 2010

Related U.S. Application Data

(60) Continuation-in-part of application No. 11/963,257, filed on Dec. 21, 2007, now abandoned, which is a division of application No. 11/236,299, filed on Sep. 27, 2005, now abandoned.

(60) Provisional application No. 60/613,274, filed on Sep. 27, 2004.

(51) Int. Cl.
*B05D 1/32* (2006.01)

(52) U.S. Cl.
USPC .............. 427/154; 427/259; 427/272

(58) Field of Classification Search
USPC .......................... 427/154, 259, 272
See application file for complete search history.

(56) References Cited

U.S. PATENT DOCUMENTS 5,618,582 A * 4/1997 VanWinckel ................. 427/259
5,866,199 A * 2/1999 Swidler et al. ............... 427/154

FOREIGN PATENT DOCUMENTS

GB          2 146 267 A   *   4/1985
WO     WO 92/02307 A1   *   2/1992

* cited by examiner

*Primary Examiner* — William Phillip Fletcher, III
(74) *Attorney, Agent, or Firm* — Albert W. Davis, Jr.

(57) ABSTRACT

The invention is a method of painting using a Differential Adhesion Composition (DAC) paint comprising a resin, a hygroscopic agent, a non-silicone surfactant, solvents, thickeners and pigments of titanium dioxide of 14 or more percent by weight. The paint sticks to the frame of a window after drying or setting and peels from the glass panes of the window in large pieces. The method of painting comprises applying the DAC paint to the non-glass surface and the glass surface, allowing the DAC paint to dry and then removing the DAC paint in large pieces from glass surface.

6 Claims, No Drawings

METHODS OF PAINTING

CROSS REFERENCE TO RELATED U.S. APPLICATION

This application is a continuation-in part of Non-provisional application Ser. No. 11/963,257 filed Dec. 21, 2007, now abandoned, which is a division of Non-provisional application Ser. No. 11/236,299 filed on Sep. 27, 2005, now abandoned, which claims priority of Provisional Application Ser. No. 60/613,274, filed Sep. 27, 2004.

BACKGROUND OF THE INVENTION

This invention relates generally to liquid masking compositions which function as a paint for painting windows. The masking composition functions as a Differential Adhesion Compound (DAC) paint which sticks to the non-glass portions of the window and peels from the glass after the paint has dried, set or cured.

Differential Adhesion Compounds (DACs) for masking are known in the art, such as described in U.S. Pat. No. 5,618,582 issued on Apr. 8, 1997 and U.S. Pat. No. 6,319,548 issued on Nov. 20, 2001 to VanWinckel, both of which are incorporated by reference. DACs are used to prepare surfaces for painting when such surfaces are adjacent to other surfaces that need to be masked from the paint (e.g., masking window glass within a window frame prior to painting the window). The DAC adheres more strongly to the surface to be painted (e.g., wood or metal) and less strongly to masked surfaces such as glass. The DAC is applied over the surface to be masked along with at least some of the surface to be painted. After the paint is applied, the DAC can be easily removed from the masked glass surface while remaining in place over the painted frame surface.

VanWinckel discloses that a DAC paint can be made by adding 4% of by weight of glycerin to the total weight of the paint or preferable 10-20% by weight of glycerin to the weight of resin in the paint to an ordinary paint (column 8, lines 35-41).

Another DAC is disclosed in U.S. Pat. No. 5,866,199 issued on Feb. 2, 1999 to Swidler et al which is incorporated by reference. Swidler discloses a DAC paint with 1-10% pigment, most preferably 3-5% (column 7, lines 1-5).

BRIEF SUMMARY OF THE INVENTION

In one embodiment, the invention is a Differential Adhesion Compound (DAC) comprising a resin, a hygroscopic agent, a non-silicon surfactant and pigment, wherein, when dry, the compound will have a greater cohesive force than an adhesive force to glass and serve as a paint. This DAC paint can have over 10% by weight of pigment solids, such as titanium dioxide.

DETAILED DESCRIPTION OF THE INVENTION

A typical composition of this invention will comprise a resin, hygroscopic agents, surfactants, solvents, thickeners and pigments.

Resin is a general term applied to a wide variety of more or less transparent and fusible products, which may be natural or synthetic. Higher molecular weight synthetic resins are generally referred to as polymers. Resin may also refer to a solid, semi-solid, or pseudo-solid organic material that has an indefinite and often high molecular weight, exhibits a tendency to flow when subjected to stress, usually has a softening or melting range, and usually fractures conchoidally. In a broader sense, the term "resin" is used to designate any polymer that is a basic material for coatings and plastics. Suitable resins can be acrylic resins, polyvinyl acetate resins, latex and alkyd resins.

Acrylic resins, also known as acrylate resins, are generally thermoplastic polymers or copolymers of acrylic acid, methacrylic acid, esters of these acids, or acrylonitrile. Typically, acrylic resins are produced by the polymerization of derivatives of acrylic acids, including esters of acrylic acid, methacrylic acid, acrylonitrile, and their copolymers. Acrylic resins which have established a pre-eminent position among coating formulators, having shown superiority in such respects as color and gloss retention, alkali and oxidation (chalk) resistance, hardness, adhesive and cohesive strength, and overall film durability.

An alkyd is a thermosetting coating polymer, chemically similar to polyester resins, conventionally made by condensation and polymerization of a dihydric or polyhydric alcohol (ethylene glycol or glycerol) and a polybasic acid (phthalic anhydride), usually with a drying oil modifier. They may be regarded as complex esters. The most common polyhydric alcohol used is glycerol, and the most common polybasic acid is phthalic anhydride. Modified alkyds are those in which the polybasic acid is substituted in part by a monobasic acid, of which the vegetable oil fatty acids are typical.

A latex is a stable dispersion of a polymeric substance in an essentially aqueous medium. Typically, a latex is a fine dispersion of rubber or resin, natural or synthetic, in water; the synthetic is made by emulsion polymerization. (Strictly speaking, after polymerization a latex is a solid dispersed in water, and therefore is not an emulsion. (Latex and emulsion are often used synonymously in the paint industry.)

Polyvinyl acetate is a thermoplastic polymer obtained by polymerization of vinyl acetate and used as a latex binder.

Any hygroscopic agent is suitable for this invention but, typically, the hygroscopic agents will be glycerol or a glycol, for example, ethylene glycol or propylene glycol or a glycol ether. Other hygroscopic agents are listed in U.S. Pat. Nos. 5,618,582 and 6,319,548, disclosure of which is incorporated by reference herein.

The surfactant is a non-silicone surfactant. The term is derived from surface active Agent. A surfactant is a compound that contains a hydrophilic and a hydrophobic segment. When added to water or solvents, a surfactant reduces the surface tension of the systems for the following purposes: wetting, emulsifying, dispersing, foaming, scouring or lubricity. Other surfactants include primary alcohol ethoxylates, octyl phenol ethoxylate, nonyl phenol ethoxylates, EO/PO non-ionics, including alcohol ethoxylates and alkyl phenol ethoxylates, fatty amine oxides, alkanolamides, EO/PO block copolymers, alkyl amine ethoxylates, quarternary ammonium compounds, imidazolines, betaines, linear alkylbenzene sulphonic acid, sodium lauryl ether sulphate, alpha olefin sulphonates, phosphate esters, sodium sulphosuccinates. One convenient class of surfactant is the sodium sulpho succinates, particularly sodium bistridecyl sulfosuccinate. Non-silicone surfactants are commercially available, such as Surfonyl® MD-20 Defoamer from Air Products and Chemicals, Inc.

Solvents will typically be water, and known resin solvents such as pyrrolidones and ethers.

Thickening agents can be resins, such as polyurethane resins, clays or other thickeners known in the art.

An example formula for the inventive masking compound is shown in Table 1.

TABLE-US-00001 TABLE 1
Differential Adhesion Compound Formula For Painting
Ingredient Percentage By Weight
Rhoplex® MC-1834; aqueous acrylic polymer emulsion: 82.83%
Surfonyl®MD-20 Defoamer; Oxirane, [[(2-ethyhexyl)oxy]methyl]-, reaction product: with polyethylene glycol ether with 2,4,7,9-tetramethyl-5-decyne-4-,7-diol (2:1); 1.02%
Hot Water: 8.33%
Attagel® 50; attapulgite clay: 1.01%
Acrysol® RM-8 thickening agent; polyurethane resin/propylene glycol/water at about 35:39:26 ratio: 1.52%
m-Pyrol® solvent; n-methyl-2-pyrrolidine: 1.01%
Aerosol® TR-70 surfactant; sodium bistridecyl sulfosuccinate in mixture of ethanol and water: 3.28%
Hexyl Carbitol®; diethylene glycol monohexyl ether: 1.01%
Total 100.00%

Pigment is added to the masking compound/DAC to provide color and thereby form a DAC paint. The amount of pigment should be high enough to provide a serviceable white or pastel paint. The DAC paint should have more than 10% pigment by weight of the solids forming the pigment. Preferably, the pigment is TiO2 (titanium dioxide). Therefore more than 10% by weight of TiO2 solids is added to the DAC of the above formula and mixed. In one example 14% TiO2 solids was used to create a white DAC paint. The white paint can be changed to a pastel paint by adding tints or other pigments. This can be done at a paint store or at the paint manufacturing site.

Suitable titanium dioxide pigments are TRONOX® CR-828 available from Tronox, Oklahoma City, Okla. and W6R452 Rutile Titanium Dioxide White Dispersion available from Reitech Corporation, Reading, Pa.

The inventive DAC paint can be applied to many different substrates to be painted, such as wood, cement, plaster, masonry, and/or metal. The surface to be painted can be bare, primed or previously painted. The surface to be masked is usually glass but may also be ceramic, polished metal, etc. A typical application is painting a window.

Pigments and toners are added so that the DAC compound serves as a paint and not merely as a sacrificial masking layer. Any substance, usually in the form of a dry powder that imparts color to another substance or mixture is a pigment. Most pigments are insoluble in organic solvents and water; exceptions are the natural organic pigments, such as chlorophyll, which are generally organosoluble. To qualify as a pigment, a material must have positive colorant value. This definition excludes whiting, barites, clays, and talc. Some pigments, such as zinc oxide, and carbon black are also reinforcing agents, but the two terms are not synonymous; in the parlance of the paint and rubber industries these distinctions are not always observed. Pigments are classified as follows: (1) Inorganic (a) metallic oxides (iron, titanium, zinc, cobalt, chromium); (b) metal powder suspensions (gold, aluminum); (c) earth colors (siennas, ochers, umbers); (d) lead chromates; (e) carbon black; (2) Organic (a) animal (rhodopsin, melanin); (b) vegetable (chlorophyll, xanthophylls, indigo, flavone, carotene); (c) synthetic (phthalocyanine, lithos, toluidine, para red, toners, lakes, etc.). Pigments are very fine powders that provide color and the ability to hide the underlying surface. Pigments are substantially insoluble in the vehicle so that they hide the underlying surface when present in suitable concentration. Pigments must also be small to provide hiding power. The influence of particle size is illustrated by titanium dioxide, which has great hiding power at a size of 0.2 to 0.3 micron, but is a perfectly clear crystal in a large size (as in the gem). The optimum particle size for providing maximum hiding power is related to the refractive index of a pigment. A high refractive index is necessary for high hiding power when a pigment is dispersed in organic vehicles. If there is only a small difference between the indices of the pigment and the vehicle, light will be transmitted through the film regardless of the particle size. Some pigments that appear white in air are non-opaque or non-hiding in vehicles because of their low refractive index. They are used, however, because they contribute other useful properties to the coating. The proportion of pigment to vehicle varies greatly with the type and use of the coating. In addition to hiding power, the amount of pigment in the non-volatile portion of the coating affects such properties of the film as gloss, flexibility, tensile strength, permeability and washability.

The DAC paint is applied on to the surface to be masked, the glass surface, as well as over the surface to be painted which is adjacent to the surface to be masked. For example, when painting a window, the DAC paint can be applied to the window glass panes and the window frame. DAC paint can be applied by brush, roller or sprayer. After the painting is complete and the paint is dry or set, the DAC paint can be lifted from the glass surface, as large pieces, such as 2, 3 or 4 pieces from a pane of glass) and frequently as a single piece. Very large panes of glass may tear into more pieces during removal. The DAC coating should be scored next to the frame and on the glass to aid in removal. The DAC paint will not lift off of the non-glass surface. As such, the cohesive force of the dried compound is greater than the adhesive force to glass but less than the adhesive force to the non-glass surface to be painted.

It is specifically intended that the present invention not be limited to the embodiments and illustrations contained herein, but include modified forms of those embodiments including portions of the embodiments and combinations of elements of different embodiments as come within the scope of the following claims.

I claim:

1. A method of painting a non-glass surface that is adjacent to a glass surface, the method comprising:
    applying a Differential Adhesion Composition or DAC paint having 10 or more percent by weight of titanium dioxide solids to the non-glass surface and the glass surface,
    allowing the DAC paint to dry for 48 or more hours, the dried DAC paint having a cohesive force that is greater than the adhesive force to the glass but less than the adhesive force to the non-glass surface, and
    then lifting the DAC paint from the glass surface in four or less pieces.

2. The method of claim 1 wherein the DAC paint has a surfactant which is a sodium sulfosuccinate.

3. The method of claim 2 wherein the surfactant is sodium bistridecyl sulfosuccinate.

4. The method of claim 1 wherein the DAC paint has a resin which is at least one of acrylic resins, polyvinyl acetate resins, latex resins or alkyd resins.

5. The method of claim 1, wherein the DAC paint has a hygroscopic agent which is at least one of glycerol, a glycol or a glycol ether.

6. The method of claim 1, wherein the non-glass surface that is adjacent to the glass surface forms part of a window.

* * * * *

UNITED STATES PATENT AND TRADEMARK OFFICE
CERTIFICATE OF CORRECTION

PATENT NO. : 8,741,382 B1  
APPLICATION NO. : 12/807435  
DATED : June 3, 2014  
INVENTOR(S) : John E Tadych Page 1 of 1

It is certified that error appears in the above-identified patent and that said Letters Patent is hereby corrected as shown below:

Title Page, Item 12, United States Patent Tadyeh should be changed to: --United States Patent Tadych--

Title Page, Item 76 Inventor: John E Tadyeh, Franklin, WI (US) should be changed to:
--Inventor: John E Tadych, Franklin, WI (US)--

Signed and Sealed this  
Thirty-first Day of May, 2016

Michelle K. Lee  
*Director of the United States Patent and Trademark Office*